United States Patent
Montani

(10) Patent No.: US 6,204,491 B1
(45) Date of Patent: Mar. 20, 2001

(54) AUTOMATIC POPCORN DISPENSER WITH MICROWAVE OVEN AND METHOD TO OPERATE THE SAME

(75) Inventor: Marco Montani, Spoltore (IT)

(73) Assignee: Paidela S.r.l., Spoltore (IT)

( * ) Notice: Subject to any disclaimer, the term of this patent is extended or adjusted under 35 U.S.C. 154(b) by 0 days.

(21) Appl. No.: 09/381,859

(22) PCT Filed: Mar. 26, 1998

(86) PCT No.: PCT/EP98/01805

§ 371 Date: Sep. 27, 1999

§ 102(e) Date: Sep. 27, 1999

(87) PCT Pub. No.: WO98/44465

PCT Pub. Date: Oct. 8, 1998

(30) Foreign Application Priority Data

Mar. 27, 1997 (IT) ............................................. MI97A0724

(51) Int. Cl.[7] ................. H05B 6/80; H05B 6/78
(52) U.S. Cl. ............ 219/679; 219/739; 219/756; 221/150 HC; 221/150 A; 99/357; 99/451
(58) Field of Search .................. 219/679, 739, 219/762, 756; 221/150 HC, 150 A; 99/357, 451, DIG. 14

(56) References Cited

U.S. PATENT DOCUMENTS

| | | |
|---|---|---|
| 3,443,509 * | 5/1969 | Sandy .................................. 219/679 |
| 3,482,509 * | 12/1969 | Gardner .............................. 219/679 |
| 3,653,541 | 4/1972 | Crum . |
| 3,838,790 | 10/1974 | Naruse . |
| 3,866,795 | 2/1975 | Urano . |
| 4,813,572 * | 3/1989 | Schmidt ....................... 221/150 HC |
| 4,848,591 | 7/1989 | Wada . |
| 5,020,688 | 6/1991 | Power . |
| 5,564,594 * | 10/1996 | Monfredo ........................ 221/150 A |

FOREIGN PATENT DOCUMENTS

| | | |
|---|---|---|
| 0 269 134 | 6/1988 | (EP) . |
| 0 288 142 | 10/1988 | (EP) . |
| 2 656 448 | 6/1991 | (FR) . |
| WO 86/04707 | 8/1986 | (WO) . |
| WO 92/00577 | 1/1992 | (WO) . |

* cited by examiner

Primary Examiner—Philip H. Leung
(74) Attorney, Agent, or Firm—Young & Thompson

(57) ABSTRACT

An automatic dispenser and a method to operate the same dispenses food prepacked in packets, particularly popcorn. The dispenser includes a frame with at least one conveying unit, at least a microwave oven and a collecting container mounted on the frame, the conveying unit being positioned above the oven and the container under the oven. The microwave oven includes at least a top inlet door and a bottom outlet door, the packets being fed one-by-one into the inlet door by way of the conveying unit, and dropping out from the outlet door into the collecting container.

18 Claims, 3 Drawing Sheets

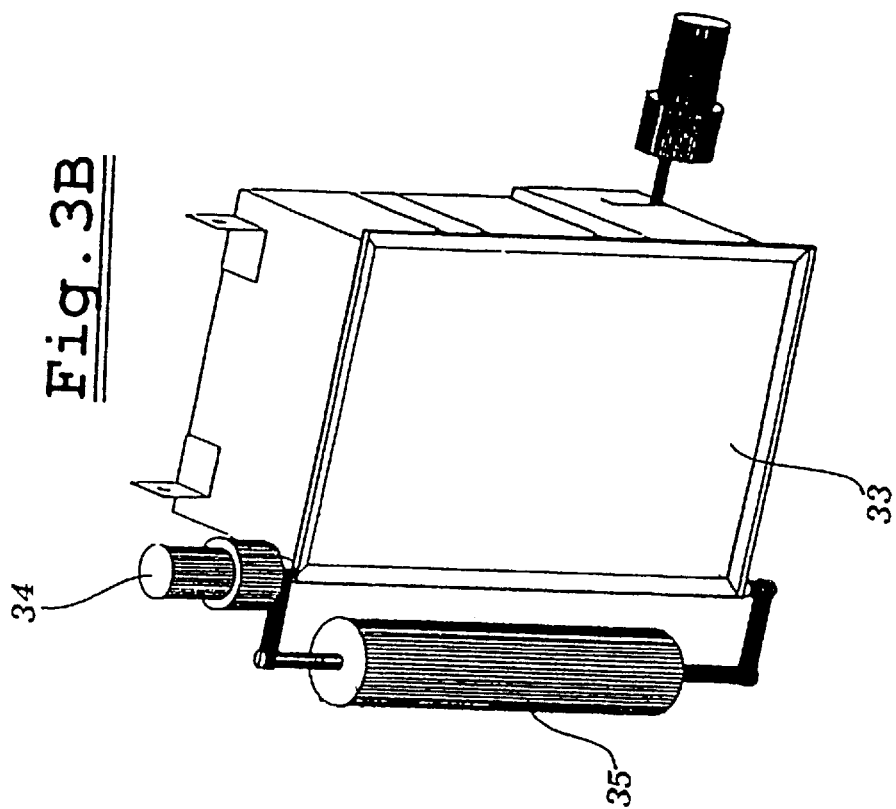
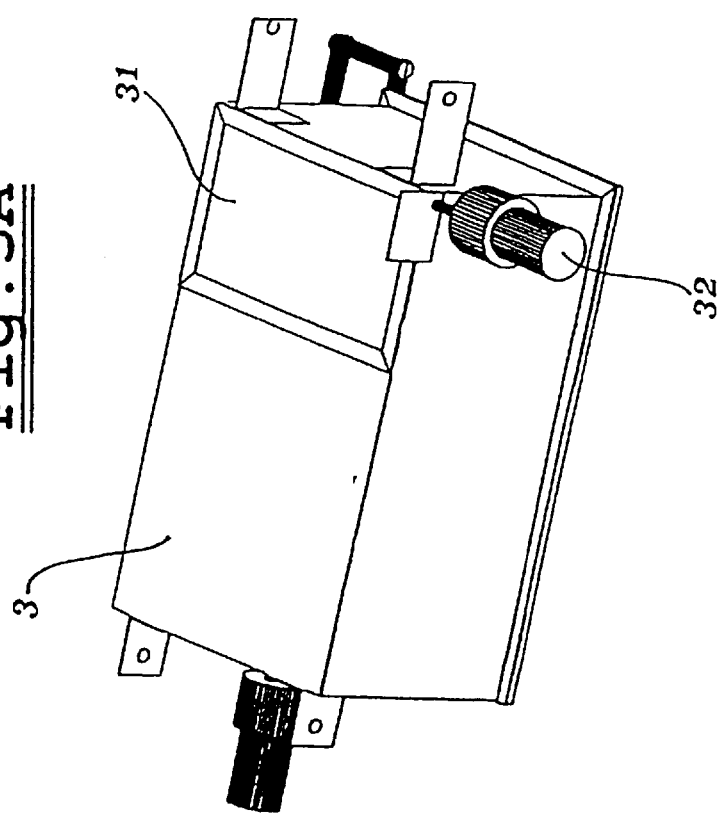

AUTOMATIC POPCORN DISPENSER WITH MICROWAVE OVEN AND METHOD TO OPERATE THE SAME

BACKGROUND OF THE INVNETION

The present invention concerns an automatic dispenser of instantly cooked prepacked food. In particular, it concerns an automatic dispenser of spiced popcorn prepacked in sealed packets.

In the wide field of automatic food dispensers, the popcorn dispensing machines are still scarcely widespread, their little success being tied to technical and hygienic factors which will be examined in detail hereinafter. Nonetheless, the request for an automatic popcorn dispensing machine is, at least potentially, very high especially where there is a large flow of public, as in cinemas, sports establishments, discotheques and so on.

What characterizes, in particular, a popcorn dispenser in respect of other automatic food and drink dispensers, and also makes it so critical, is the fact that corn should be preferably kept raw, and then be popped just before being eaten, so as to be fragrant and appetizing. It is also fundamental for the corn seeds to be kept in such a dispenser in hygienically safe conditions and there should be no possibility of interaction between the cooking apparatus and the consumer; when popping corn seeds for domestic use, all these requirements are of course neglectable.

In fact, at home, the corn seeds are normally popped in boiling oil until they burst; they are then strained to remove the oil in excess, and salt or sugar is added to make them tasty. Evidently, such an operating sequence is quite easy to carry out manually, being fairly cautious so as to create no problems; in theory, it would be the ideal sequence which should be exactly followed also by the dispensing machine, failing which the popcorn obtained would not be tasty and thus be unsaleable.

Nevertheless, the popping in oil, as done at home, is unfeasible in the case of automatic dispensing machines, in that it would be necessary to dispose of large quantities of frying oil, which is subject to fast deterioration and which can no longer be used after a few times; without taking into account that it is quite unhealthy to keep fried oil in a container while waiting for the successive cooking operation.

To overcome this drawback, semi-automatic popcorn dispensing machines have been produced, which pop a large amount of corn seeds in a single step and subsequently dispense it in small doses. This technique can be advantageous if there is a high consumption of popcorn, whereby the popped and burst corn seeds are not kept in the machine for a long time with the risk of deteriorating in contact with air.

According to a different technique, a machine to pop corn seeds is fed with hot air produced by a resistor (as in EP-A2-265.361). However, the taste of popcorn treated in this way is not so appreciated as that of popcorn obtained with the traditional home technique. Moreover, the heat supplied by the resistor does not allow very short cooking times whereby, to make sure that a popcorn dispenser for the public is efficient and productive, it is indispensable to make it of large dimensions and to pop, also in this case, great quantities of corn which are then dispensed to the consumers in small doses.

In recent times, it has been thought to produce suitable packages for domestic use which contain, inside a sealed packet, a dose of corn for one person, with a predetermined amount of oil and spice. The single prepacked packet is heated with a heating source, swelling up as the corn seeds, bursting, expand inside the same.

Different versions of said practical, hygienic and long-life packages have been produced, according to the type of heat source adopted, and they all provide excellent results as far as the final product obtained. One of such packages has been particularly studied for use with domestic type microwave ovens (see EP-B1-545.611). In fact, if done at home, the popping of corn in such a prepacked packet, carried out in a microwave oven, involves no problems nor does it require any special precautions.

Viceversa, the use of such a prepacked packet in a microwave oven, associated to an automatic dispenser, causes a series of problems which have so far made it unproposable to produce a machine thus conceived.

To start with, the prepacked packet should be introduced in the oven in the correct position, namely in a position allowing the microwaves to act with the highest efficiency on the food to be cooked.

In particular, the prepacked packets specially meant for this type of oven comprise a sheet-metal insert which should remain under the food, in respect of the magnetron source of the oven, so as not to act as screen for the microwaves. Hence, the packets should be positioned into the oven in the right sense.

However, the possibility for the consumer to act inside or close to the oven should be positively avoided, as the microwave oven is a source of possible electrical discharges, or of high-frequency electromagnetic waves, which are harmful to a person's health. Besides, as known, special care should be dedicated to the safety of machines for public use.

The oven should thus be provided with openings—both to let in the prepacked packets and to let out said packets—which allow a fully automatic insertion and ejection of said packets without requiring human intervention.

Moreover, the automatic dispenser should guarantee the feeding of a single prepacked packet at a time, to avoid the simultaneous presence of several packets in the oven.

Finally, the cooking apparatus should be at the same time simple and highly efficient, so that the dispensing machine may be economically advantageous.

SUMMARY OF THE INVENTION

FR-A1-2656448 disclose a vending machine provided with a conveying unit, a microwave oven and a collecting container, where the pre-packed packet of raw food runs across the machine only by gravity. However, the packet is guided only up to the entry of the oven and then it is left to fall inside to this latter. The oven, besides, has the opening and closing doors sliding in two parts, what can cause jamming and sealing problems of the microwave oven.

In FR-A-2458851 a vending machine very similar to the one described in FR-A1-2656448 is disclosed. However, here the packet of row food is left to fall by the conveying unit—with the risk of overturning the packet—on an inclined plane below, which then guides the packet up inside the microwave oven. Besides, the microwave oven is arranged on an inclined cooking plane and this is not an optimal characteristic for a good operation of the same: in fact the packet will tend to locate in the lower corner where the microwaves cannot express at the best their power.

None of these systems, however, guide the packet along all its way up to the cooking position in the microwave oven.

Thus the packet may put itself in an undesired position being free to fall for a certain distance without any guide. In view of the problem of correctly positioning the packet in the centre of the microwave oven with the chosen orientation, different solutions have been suggested (for example U.S. Pat. No. 5,020,688 and EP-A2-269.134) all rather complex, articulated and expensive.

The object of the present invention is to thus supply an automatic popcorn dispenser apt to satisfy the above requirement and particularly:

prevent the consumer from interacting inside the oven, by carrying out a fully automatic treatment on the prepacked packets and, once the corn has been popped, feeding the popcorn packets into a container independent from the cooking area;

supply a fully automatic inlet and outlet system, into and out of the microwave oven, which however involves a sufficient structural simplicity as not to result too costly;

adopt an oven which is as optimal as possible for the specific use and which is integrated in the global automatism of the system;

be of easy access and maintenance for the operator assigned to the task, and, over all, to provide for an introducing path towards the microwave oven which guides the prepacket packets of raw food without ever leaving it to fall freely.

According to the present invention, said objects are reached with an automatic dispenser as claimed herein.

BRIEF DESCRIPTION OF THE DRAWINGS

Further characteristics and advantages of the apparatus and method according to the present invention will anyhow be more evident from the following detailed description of a preferred embodiment thereof, given by way of example and illustrated on the accompanying drawings, in which:

FIGS. 3A and 3B are perspective views showing, respectively, from the top and from the bottom, a preferred embodiment of the microwave oven.

DESCRIPTION OF THE PREFERRED EMBODIMENTS

Figure 1:
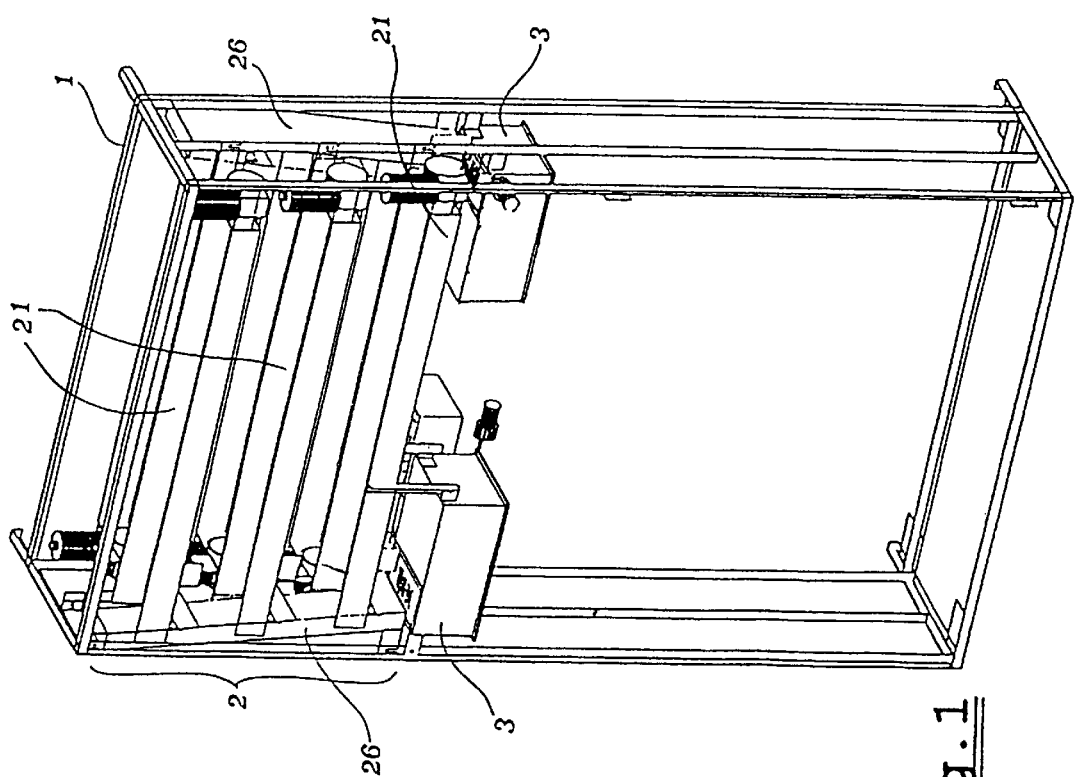
FIG. 1 is a perspective view showing part of the automatic dispenser without its outer casing.

As can be seen in FIG. 1, the automatic dispenser according to the present invention substantially comprises a frame 1, a conveying unit 2 with chute 26, and a microwave oven 3. The drawing illustrates two dispensing units combined in the same apparatus, whereby two opposite conveying units are provided, each one feeding a respective microwave oven 3 (see also FIG. 2). This arrangement is illustrated by mere way of example, since the apparatus could be provided with a single dispensing unit, as well as with more than two independent microwave ovens; the following description will thus refer to an apparatus comprising a single dispensing unit (hereinafter simply called dispenser).

The conveying unit 2 is positioned at the top of the apparatus, so as to take advantage of the gravity downfall of the prepacked corn packets along the chute 26. The single components thus include, in succession starting from the top: the conveying unit 2; the oven 3; and a collecting container 4—shown in FIG. 2—to which the consumer may gain access in order to recover the popcorn packet.

Figure 4:
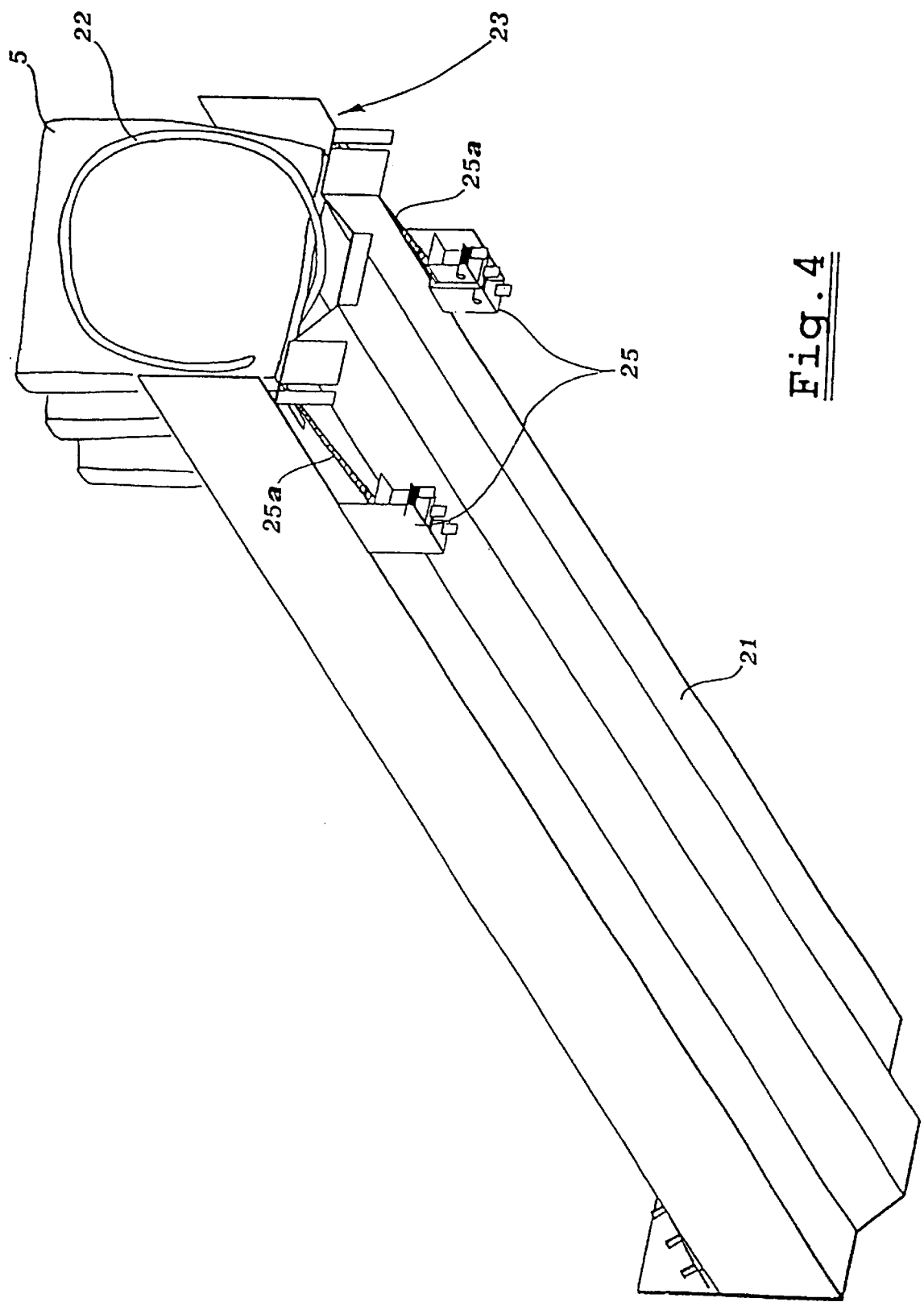
FIG. 4 is a perspective view of a conveying channel, according to a preferred embodiment of the invention.

Though a storage unit for the prepacked corn packets can be provided above the conveying unit 2, or in correspondence therewith, according to a preferred embodiment of the present invention it is the actual conveying unit which also acts as storage unit. For this purpose—as shown in FIG. 4—the storage-conveyor 2 comprises one or more channels 21, mounted on the frame 1 in a substantially horizontal position and each comprising a spiral 22, with wide coils, apt to hold back and feed one by one—according to a known principle—a plurality of bags or packets 5 (typically fifty) inserted between one coil and the next, each packet 5 being fed towards an open end 23 of the channel 21.

The bottom surface of the channels 21 has a gull-wing section, to allow at least partially housing the spiral 22 below the plane onto which bear the packets 5. The spiral 22 is rotated by an electric motor 24 (shown in FIG. 2) which, at each working step, causes the spiral to perform a full rotation so as to move forward all the packets by one step (corresponding to the pitch between one coil and the next) and push out of the channel 21 the packet 5 which, in the previous step, was facing the open end 23, causing the downfall of said-packet.

Preferably, microswitches 25 are provided in correspondence of the open end 23 of the channel 21, to detect the presence of a packet 5 in correspondence of the last coil of the spiral 22. The microswitches 25 comprise a stem 25a, an end of which extends through the bottom of the channel 21 projecting upwards: when a packet 5 reaches the last coil, its weight bears on the end of the stems 25a, causing them to bend and thereby operate the microswitches 25. The double purpose of said detection is to correctly stop the electric motor 24 at each step, as soon as the packet 5 reaches the end 23, and to reckon the emptying of the storage-conveyor 2 when the last packet has abandoned the same.

According to a different embodiment (not illustrated), the microswitches can be provided at the end of the chute, or dropping path of the packets 5, which is common to all the conveying channels 21. It will thus be sufficient to adopt a single microswitch for each oven 3. In this case, the motors 24 are of a type apt to perform one complete revolution at a time, so that the spiral 22 may rotate by one step at a time.

As said, a single microwave oven 3 can be fed by more channels 21, positioned one above the other so as to limit the transversal dimensions of the apparatus. Thus, when the microswitches 25 no longer detect the presence of packets 5—which means that a channel 21 has emptied—a second channel 21 is started off, and this procedure continues until the storage-conveyor has been totally emptied. At this point, an authorized person will provide to fill again the automatic dispenser.

Alternatively, the single channels 21 may convey prepacked packets containing different spices (for instance, corn with sugar and corn with salt), so as to allow the consumer a greater possibility of choice. In this case, it will thus be possible for the consumer to operate a selection which will start off the appropriate channel 21.

When the prepacked packet 5 is pushed beyond the open end 23 of a channel 21, it drops onto the chute 26—common to all the channels of the storage-conveyor 2 feeding a same microwave oven (see FIG. 1)—and it falls into the oven 3. Said oven, positioned under the chute 26, comprises—as shown in FIG. 3A—an inlet door 31, towards which the chute directs the packet 5.

The inlet door 31 is tilting on a hinge, provided along one side thereof, and it opens towards the inside of the oven 3 so as to actually form a final portion of the chute 26 into the oven itself. An abutment (not shown) is possibly provided on the bottom of the oven 3 to stop the downfall of the packet 5, dropping from the chute, setting it in the required central position.

Though the inlet door 31 can be provided onto a lateral surface of the oven 3, it is preferably formed on its upper surface and hinged along one of its minor sides, which—according to requirements imposed by the microwave technology—is preferably of parallelepiped shape. The inlet of the packet from the narrow side of the oven allows to take advantage of its headway, determined by the downfall along the chute 26, so as to cause it to slide onto the bottom in a direction parallel to the long side of the oven and thereby reach the required central position. It should be underlined that the positioning of the prepacked packet at the centre of the oven is of great importance, since the energy let out by the magnetron of the microwave oven actually concentrates in said area.

According to a preferred embodiment of the invention, the packet 5 is dropped along the chute 26 when the inlet door 31 is closed. In this case, the packet 5 will be simply laid down inside the oven following the opening of the inlet door 31.

If the prepacked packet should be of the type comprising a metal insert—as mentioned heretofore—it is necessary to make sure that such a packet is inserted between the coils of the spiral 22 in the correct position, allowing it to drop into the oven in the right sense.

In a preferred embodiment of the invention, a bar code scanner (not shown) is provided close to the inlet into the oven, said scanner being apt to reckon the type of packet 5 about to be cooked and to regulate, accordingly, the cooking time and any other possible working parameters. According to the present invention, once the prepacked packet 5 is inside the oven 3, the inlet door 31 can be closed again by means of an electric motor 32. In these conditions the cooking process may start.

Also the ejection of the packet 5, containing popcorn, takes place by gravity. In fact, as shown in FIG. 3B, the bottom of the oven 3 is formed by a tilting outlet door 33, which is hinged along one of its sides and is apt to open so as to drop the packet 5.

Preferably, the doors 31 and 33 are kept closed by respective electric motors 32 and 34 which remain energized. At the end of the cooking step, the tension fed to the motor 34 of the door 33 is inverted, causing said door to tilt in the opposite sense, and thereby opening the same. A counterweight 35 is possibly provided to balance the weight of the door 33—and of the popcorn packet resting thereon—on its hinge, so that the electric motor 34 may work in a condition of substantial neutral balance.

To ensure a hermetic sealing of the oven 3, the inlet and outlet doors 31 and 33 comprise toothed metal packings (not shown). To prevent the anode currents, induced by the microwaves between the metallic shell of the oven and the metal packings, from corroding them, such packings are made from noble or passivatable metal alloys, for instance nickel or beryllium alloys. Said packings utilize the elasticity of the metallic material to guarantee a seal along the non-hinged sides of the doors. The distance between the teeth of the packing is adjusted so as to positively avoid forming openings wider than the half-length-wave of the microwaves.

Figure 2:
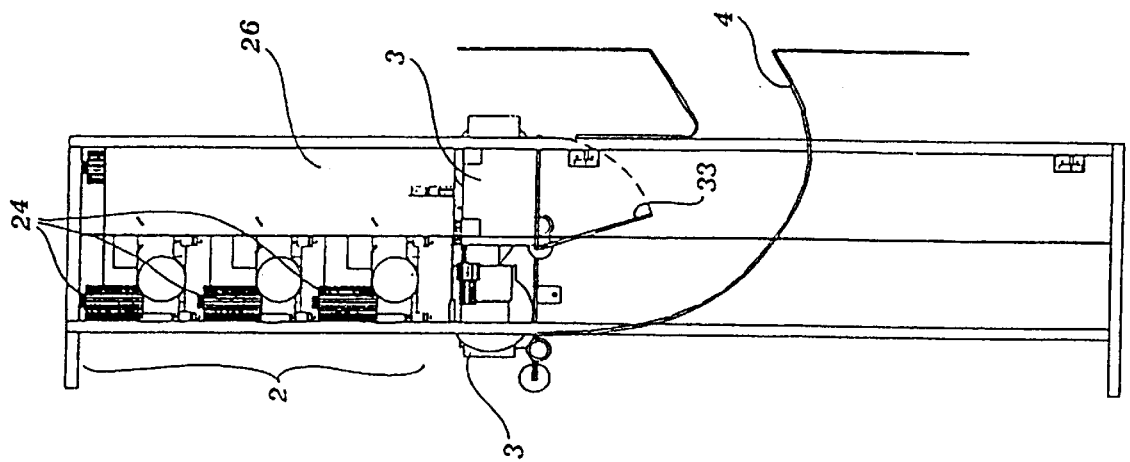
FIG. 2 is a side elevation view of the automatic dispenser without its outer casing.

Finally, on opening of the outlet door 33, the popcorn packet 5. ready for use, drops into the container 4 from which the consumer may collect the same. As shown in FIG. 2, the container 4 is formed with a bend such as to prevent a careless or ill-disposed consumer from slipping his arm into the dispenser, up to reaching and contacting the cooking area where the ovens 3 are positioned. More exactly, the container 4 is formed as a wide U-shaped channel, the arms of the U being positively longer than the average length of a human arm, for instance longer than 1 m. Alternatively, the access to the container 4 can be barred by any of the known antiintrusion systems, such as tilting wickets, trap-doors, and the like.

The whole sequence of operations performed by the dispenser is automatically controlled and monitored, for example through a logic system (not shown).

At the end of each working step, the logic control system tests each component to verify that the operation has been correctly performed. This is meant to prevent working faults which, if involving critical components, may result highly dangerous. In fact, the ovens 3 work under high tension, with electromagnetic waves which are potentially dangerous if they are not controlled according to the program parameters. The logic system controls these tests, interrupting the operation in the event of verifying a fault on a critical component.

According to a preferred working method of the automatic popcorn dispenser—wherein the prepacked corn packets are cooked and the popcorn packets are subsequently dispensed to the public—the consumer should start on a selection panel a logic system, so as to control the following sequence of operations:

a) close the tilting outlet door 33 of the oven 3, and open the tilting inlet door 31 onto which, in a previous step, a prepacked corn packet 5 has been dropped;

b) close the inlet door 31 and turn on the magnetron source to heat the oven 3;

c) turn off the magnetron source after a preset cooking period;

d) open the outlet door 33 to drop the popcorn packet, by gravity, into the collecting container 4 accessible to the consumer;

e) operate a storage-conveyor 2 of prepacked corn packets 5 and feed said packets, one by one, to the chute 26 along which the single packet drops by gravity onto said tilting inlet door 31.

To prevent a consumer from reaching any of the components of the dispenser, the latter is provided with an outer casing (not shown) having also an aesthetic function. Said casing allows access into the collecting container 4 and is apt to house a request and selection mechanism—in combination with a coin slit or other similar device—to allow interacting the consumer, so that he may operate his selections.

Obviously the outer casing can be easily removed, at least partially, to allow a qualified operator to inspect the inner components of the dispenser.

The automatic popcorn dispenser, as described heretofore, fully satisfies the objects of the present invention. Its structure is in fact simple, and thus reliable and economic. It perfectly preserves the prepacked packets containing corn seeds, converting them—on request—into popcorn packets, with an instant cooking and with no human intervention. Once its outer casing, or part thereof, has been removed, it can be easily handled for maintenance. Finally, each step is carried out in sequence and, at each step, the correct working of the various components is tested and checked, thereby guaranteeing to the consumer a full safety and reliability.

It is anyhow understood that the invention is not limited to the particular embodiment described heretofore, which merely forms a nonlimiting example of its scope, but that several modifications can be introduced therein, all within reach of a person skilled in the art. without thereby departing from the protection field of the invention itself.

Particular reference is made to the number of the single components which may be combined according to the special requirements of the owner of the machine. By adopting two feeding lines, placed opposite into the same apparatus, there is a saving of costs from the constructive point of view (more ovens feed a single collecting container, by means of a single electronic control system and within a single frame), a further reliability (if a feeding line should fail, the dispenser may continue to operate with the other feeding line), and a further productivity; but nothing prevents from constructing a dispenser with a single feeding line, or even with more than two feeding lines.

Furthermore, though reference has been made to a conveying unit with channels and spirals, any suitable conveyor apt to feed a single prepacked packet to the ovens can be adopted for the purpose.

In particular, it may be provided for the conveying unit to be at least partially set in a conditioned room, for instance a cold-storage room, apt to preserve the fragrance of the prepacked food.

Finally, though the dispenser and, particularly, the microwave oven have been conceived for prepacked corn packets, to supply popcorn, the same apparatus can be used to cook, with an automatic procedure, similar packets containing other varieties of food, without thereby departing from the above inventive idea.

What is claimed is:

1. Automatic dispenser for food pre-packed in packets (5), comprising a frame (1) with at least one conveying unit (2), at least a microwave oven (3) and a collecting container (4) mounted on said frame, the conveying unit (2) being positioned above the oven (3) and the container (4) under the oven, said microwave oven (3) comprising at least a controlled inlet top door (31) and a controlled outlet bottom door (33), said packets (5) being fed one by one by said conveying unit (2) through a feeding chute (26) and said inlet top door (31) into said oven (3) and out of said oven through said outlet bottom door (33) into said collecting container (4) along a dropping path along which the packets run only by gravity, wherein said inlet top door (31) is tiltably hinged to the oven and it forms, in the opened status, a final portion of said chute (26) into the oven itself.

2. Automatic dispenser according to claim 1, wherein said microwave oven (3) is of parallelepiped shape and said packets (5) are fed into said oven, from the top, through one of its minor sides.

3. Automatic dispenser according to claim 1, wherein said inlet door (31) is hinged along one of the short sides of said microwave oven such that, in the open position of said inlet door, it imparts to the food packet (5) falling into the oven a direction of motion parallel to the long side of the oven.

4. Automatic dispenser according to claim 1, wherein said outlet door (33) is formed by the whole tilting bottom of said microwave oven (3), being hinged along one side thereof.

5. Automatic dispenser according to claim 4, wherein said inlet and outlet doors (31, 33) are kept closed by electric motors (32, 34) which remain energized.

6. Automatic dispenser according to claim 5, wherein said outlet door (33) comprises a counterweight (35) apt to balance, on its tilting hinge, the actual weight of the door and of the pre-packed packet (5) resting thereon.

7. Automatic dispenser according to claim 4, wherein said doors (31, 33) comprise a toothed packing forming a seal against the microwaves.

8. Automatic dispenser according to claim 7, wherein said packing is of metal.

9. Automatic dispenser according to claim 8, wherein said packing is of beryllium alloy.

10. Automatic dispenser according to claim 1, wherein the collecting container (4), positioned under the oven (3), is bent into a wide U-shaped channel, the arms of the U being longer that 1 m.

11. Automatic dispenser according to claim 10, wherein said storage and conveying section consists of one or more channels (21), each housing a spiral with wide coils, between which said pre-packed packets (5) are inserted, said spiral being caused to rotate by steps to move said packets forward one by one.

12. Automatic dispenser according to claim 11, wherein the bottom of said channels (21) has a gull-wing section.

13. Automatic dispenser according to claim 1, wherein said conveying unit (2) comprises a storage and conveying section (21), as well as a feeding chute (26) leading into the oven.

14. Automatic dispenser according to claim 13, wherein said conveying unit (2) comprises detection means (25, 25a), to detect the presence of a pre-packed packet (5) of raw food.

15. Automatic dispenser according to claim 1, wherein said pre-packed packet (5) of raw food contains spiced corn to be popped into popcorn.

16. Method for the automatic and instant cooking of pre-packed packets (5) containing raw food to be dispensed to the public, using an automatic dispenser according to claim 1, comprising the steps of:
   picking one by one, from a storage unit (2), said pre-packed packets containing food;
   feeding said packet towards a microwave oven (3) with magnetron source, by conveying it along a feeding chute (26);
   cooking in said oven (3) the food pre-packed in said packet (5) and subsequently dropping the packet (5) with the cooked food into a collecting container (4) accessible to the consumer, characterized in that said packet (5) is fed towards the microwave oven (3) onto a tilting inlet top door (31) in the closed status, which inlet top door (31) subsequently opens inwardly causing the packet to lay down on to the bottom of said oven (3).

17. Method according to claim 16, wherein before cooking said pre-packed packet (5) of raw food is detected through a scanner so as to regulate, accordingly, a cooking period.

18. Method according to claim 16, wherein said pre-packed packet (5) of raw food contains spiced corn to be popped into popcorn.

* * * * *